(12) United States Patent
Goosman

(10) Patent No.: US 6,467,293 B1
(45) Date of Patent: Oct. 22, 2002

(54) GROCERY DELIVERY VEHICLE

(75) Inventor: Gregory M. Goosman, Mason, OH (US)

(73) Assignee: The Kroger Company, Cincinnati, OH (US)

( * ) Notice: Subject to any disclaimer, the term of this patent is extended or adjusted under 35 U.S.C. 154(b) by 0 days.

(21) Appl. No.: 10/008,167

(22) Filed: Dec. 5, 2001

Related U.S. Application Data
(60) Provisional application No. 60/313,532, filed on Aug. 20, 2001.

(51) Int. Cl.[7] .............................. B60H 1/32; F25D 11/02
(52) U.S. Cl. ...................... 62/239; 62/442; 62/DIG. 16
(58) Field of Search ........................... 62/239, DIG. 16, 62/442

(56) References Cited

U.S. PATENT DOCUMENTS

| | | | |
|---|---|---|---|
| 1,333,670 A | 3/1920 | Moseley | |
| 1,425,789 A | 8/1922 | Moseley | |
| 1,873,572 A | 8/1932 | Galamb | |
| 2,617,270 A | 11/1952 | Ruth | 62/117 |
| 2,633,714 A | 4/1953 | Wehby | 62/6 |
| 2,696,084 A | 12/1954 | Kirkpatrick | 62/3 |
| 2,957,317 A | 10/1960 | Parker | 62/186 |
| 3,191,400 A | 6/1965 | Swenson | 62/239 |
| 3,362,179 A * | 1/1968 | Kirkpatrick | 62/239 |
| 3,976,458 A | 8/1976 | Krug | 62/175 |
| 4,087,125 A | 5/1978 | Stephens | 296/24 |
| 4,459,821 A | 7/1984 | Cabell et al. | 62/239 |
| 4,505,126 A | 3/1985 | Jones et al. | 62/239 |
| 4,553,584 A | 11/1985 | Bloomquist | 165/30 |
| 4,726,196 A * | 2/1988 | Zajic | 454/88 |
| 4,772,063 A | 9/1988 | Amy | 296/37.1 |
| 4,926,655 A * | 5/1990 | King | 62/244 |
| 5,054,295 A | 10/1991 | Goulooze | 62/239 |
| 5,125,710 A | 6/1992 | Gianelo | 296/37.1 |
| 5,129,235 A | 7/1992 | Renken et al. | 62/200 |
| 5,161,848 A | 11/1992 | Lutton | 296/24.1 |
| 5,272,887 A | 12/1993 | Zendzian, Sr. | 62/295 |
| 5,704,676 A | 1/1998 | Hill | 296/24.1 |
| 6,295,826 B1 * | 10/2001 | Lee | 62/244 |

FOREIGN PATENT DOCUMENTS

| | | |
|---|---|---|
| DE | 4410544 | 12/1994 |
| JP | 1109137 | 4/1989 |

OTHER PUBLICATIONS

Photographs of Tesco truck.
Photograph and article regarding Safeway truck.

* cited by examiner

Primary Examiner—William E. Tapolcai
(74) Attorney, Agent, or Firm—Wood, Herron & Evans, L.L.P.

(57) ABSTRACT

A vehicle adapted to hold and transport groceries for home delivery comprises a chassis and a storage unit. The storage unit includes multiple compartments maintained at different temperatures to keep items placed therein refrigerated, frozen or at ambient temperature. Each of the compartments is easily accessible from the ground and has at least one rack mounted therein. The racks support totes filled with grocery orders.

22 Claims, 8 Drawing Sheets

GROCERY DELIVERY VEHICLE

CROSS REFERENCE TO RELATED APPLICATIONS

This patent application claims priority to provisional patent application Ser. No. 60/313,532 filed Aug. 20, 2001 entitled "Grocery Delivery Vehicle" which is fully incorporated by reference herein.

FIELD OF THE INVENTION

This invention relates to vehicles, and more particularly, to trucks adapted to carry groceries for home delivery.

BACKGROUND OF THE INVENTION

The conventional method of obtaining groceries is to drive or otherwise transport oneself to a grocery store. The grocery store carries or stocks all the desired groceries. After walking through aisles and choosing the items one desires to purchase, one checks out with an employee of the grocery store and after paying for the groceries, takes the groceries home for consumption.

With the widespread use of the Internet, a new method of obtaining one's groceries has been developed and practiced. Rather than traveling to a grocery store, one may now place a grocery order with a company over the Internet. The company will fill the order and then deliver the ordered groceries to the desired location, such as one's residence, for example. Several companies have provided such services.

In order to cost efficiently transport the ordered groceries to the homes of the individuals or families ordering the groceries, a vehicle is needed which has adequate capacity to carry several orders of groceries. Common passenger or cargo vans have been used for this purpose prior to the present invention. However, such vans have limited capacity to carry groceries, and furthermore, do not have any means to keep items either frozen or refrigerated. Consequently, a need exists for a vehicle which is capable of transporting multiple grocery orders arranged in an orderly fashion and which has the ability to keep groceries refrigerated or frozen.

Several vehicles have been designed and utilized to transport food items which have multiple compartments which may be maintained at different temperatures in order to keep food items stored therein at the desired temperatures. For example, U.S. Pat. Nos. 2,633,714 and 4,505,126 disclose tractor trailers for use with trucks used to transport food products which have multiple compartments maintained at different temperatures. However, each of these vehicles is designed to transport bulk quantities of food products to grocery stores, as opposed to individual orders to be taken to individuals' homes.

One method of separating different orders and efficiently transporting them for home delivery has been to place individual orders into totes and store the totes on racks placed inside the vehicle compartments. However, during transport the totes may shift and move, potentially damaging the inside of the truck, the food items stored in the totes or the totes themselves.

Therefore, it has been one objective of the present invention to provide a compartmentalized vehicle which is able to safely transport groceries placed in totes and maintains the groceries at either room temperature, a temperature below freezing or a temperature slightly above freezing.

Further, it has been an objective of the present invention to provide a vehicle which is able to safely and efficiently store multiple totes, each tote being filled with groceries.

Further, it has been an objective of the present invention to provide a vehicle which may be quickly and easily loaded and unloaded by the driver of the vehicle from the curb or passenger side of the vehicle.

SUMMARY OF THE INVENTION

The present invention comprises a vehicle adapted to store and transport groceries for home delivery. The vehicle may comprise a chassis supported by wheels driven by an engine located in a front cab of the vehicle, as is conventional. A storage unit is supported by the chassis behind the front cab. The storage unit functions to store groceries at an appropriate temperature so they do not spoil while they are being transported by the vehicle.

The storage unit is divided into multiple compartments maintained at different desired temperatures by insulated dividers. Each compartment has a tote rack built therein which is sized so as to hold and support a specific number of totes filled with grocery orders. Each tote is able to hold a predetermined volume of groceries. However, containers of different sizes and configurations may be used in accordance with the present invention.

One of the compartments of the storage unit is a freezer compartment. The interior of this compartment is maintained at a temperature below freezing temperature (at approximately −5 degrees Fahrenheit). Another compartment, a refrigerated compartment, keeps items cool (at approximately 38 degrees Fahrenheit) although not frozen. The freezer and refrigerated compartments each have an insulated lockable entry door mounted on the passenger side of the storage unit which may be opened by an individual standing on the ground beside the vehicle. In each of the two preferred embodiments of the present invention, the freezer and refrigerated compartments may be approximately the same size. However, different sizes, configurations and orientations may be used in accordance with the present invention.

The storage unit of the vehicle further comprises at least one dry goods compartment which is at ambient temperature. Each of the dry goods compartments has at least one lockable entry or access door which is preferably on the passenger side of the storage unit but may be on either side of the storage unit. Each of these entry doors is preferably a roll-up door, as is commonly used in delivery trucks. However, any type of door may be used. Like the refrigerator and freezer compartments, each of the dry goods compartments has at least one tote rack therein, adapted to store multiple delivery totes, each tote being filled with a delivery order.

The storage unit of the vehicle can include at least one belly box located underneath the compartments described hereinabove. Each belly box is adapted to store additional groceries at room or ambient temperature, such as bags of dog or cat food. However, it is within the contemplation of the present invention that the interior of each belly box be maintained at a temperature slightly above freezing temperature (refrigerated) or maintained at a temperature below freezing temperature. Each belly box has a lockable, side-mounted entry door on the passenger side of the vehicle to allow access to the interior of the belly box. When opened, the entry door of each belly box is able to support the weight of the vehicle's driver and therefor may be used as a step or foot stool by the vehicle's driver to reach totes located inside the interiors of the various compartments. Other types of doors may also be used in accordance with the present invention.

The storage unit of the vehicle may be advantageously designed with all the entry or access doors to all compartments being located on the passenger side of the vehicle. This design enables the vehicle's driver to safely unload totes filled with grocery orders without having to be concerned with traffic. The vehicle's driver need not waste time waiting for traffic to pass before unloading an order. Although, it is preferable that the entry or access doors to all compartments be located on the passenger side of the vehicle, it is within the contemplation of the present invention that the entry or access doors to the various compartments including the belly boxes be located either side of the vehicle.

The rear of the vehicle has no doors, but is specifically configured to store a two-wheeled cart for purposes of transporting the totes full of groceries once they are unloaded from the vehicle. Any type of cart may be secured to the rear of the vehicle to aid the driver in unloading and transporting the grocery orders.

The invention presently contemplates two different embodiments or versions of vehicle although other versions are possible as well. In a first preferred embodiment of the present invention, a condenser/compressor unit (otherwise known as a refrigeration unit) is mounted partially on top of the vehicle's roof generally above the refrigerator compartment and functions to cool the freezer compartment and refrigerator compartments. One refrigeration unit which has proven satisfactory is manufactured by Thermo King Corporation and sold as model V-200 Max. This refrigeration unit utilizes one compressor powered by the vehicle's engine and another powered by an electric motor and located in a roof unit. The refrigeration unit further comprises two evaporator units: one is located in the freezer compartment, and the other is located in the refrigerator compartment. When the truck is moving, the vehicle's engine drives one of the compressors which powers the evaporators to keep the refrigerated and freezer compartments cold. When the truck is stopped and the engine is not running, for example, when the truck is being loaded, the refrigeration unit is plugged into a power source at the store in order to power the electric motor located in the roof unit to drive the second compressor, thereby keeping the evaporators running and the compartments cool. In this embodiment, the dry goods compartment is located in front of the freezer and refrigerated compartments.

In a second preferred embodiment of the present invention, the freezer and refrigerated compartments of the storage unit are not cooled by evaporators located therein, but rather are cooled by a eutectic refrigeration system including cold plates mounted on the walls or ceilings of the compartments. A compressor/condenser or refrigeration unit is mounted underneath the freezer and storage compartments and electrically plugged into a source of power. This type of refrigeration is referred to in the industry as "eutectic" refrigeration or "plug-in only". In this embodiment of the present invention, for proper weight distribution, the freezer and refrigerator compartments may be located in front of the dry goods compartment. The eutectic refrigeration system includes at least one cold plate mounted in the freezer compartment to maintain the freezer compartment at a temperature below freezing temperature and at least one cold plate mounted in the refrigerated compartment to maintain the refrigerated compartment at a temperature slightly above freezing temperature. It will be appreciated that other types of refrigeration systems may be used as well.

These and other objects and advantages will be more readily apparent from the following description of the drawings.

DETAILED DESCRIPTION OF THE DRAWINGS

Figure 1:
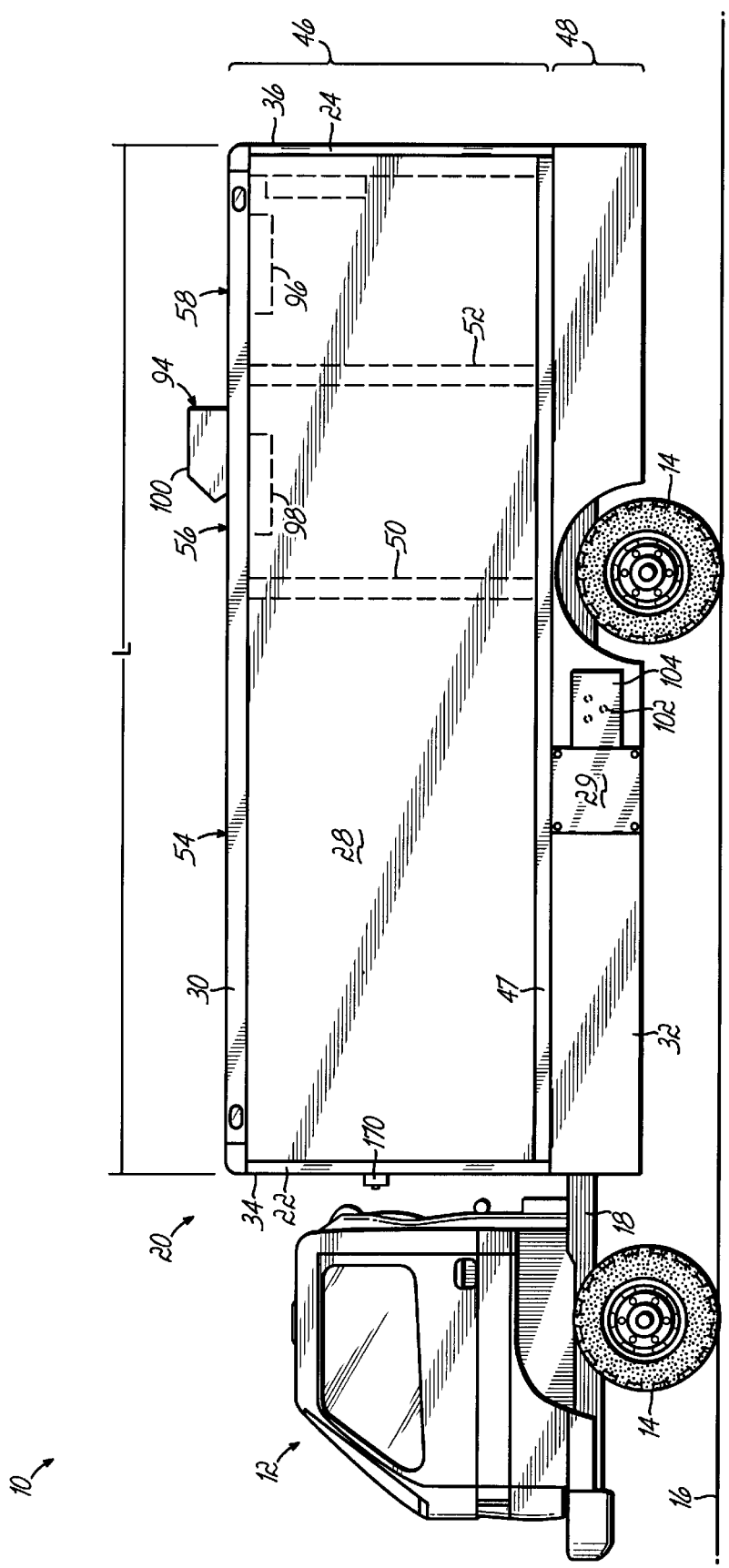
FIG. 1 is a side elevational view of the driver's side of a first preferred embodiment of the vehicle of the present invention.
Figure 2:
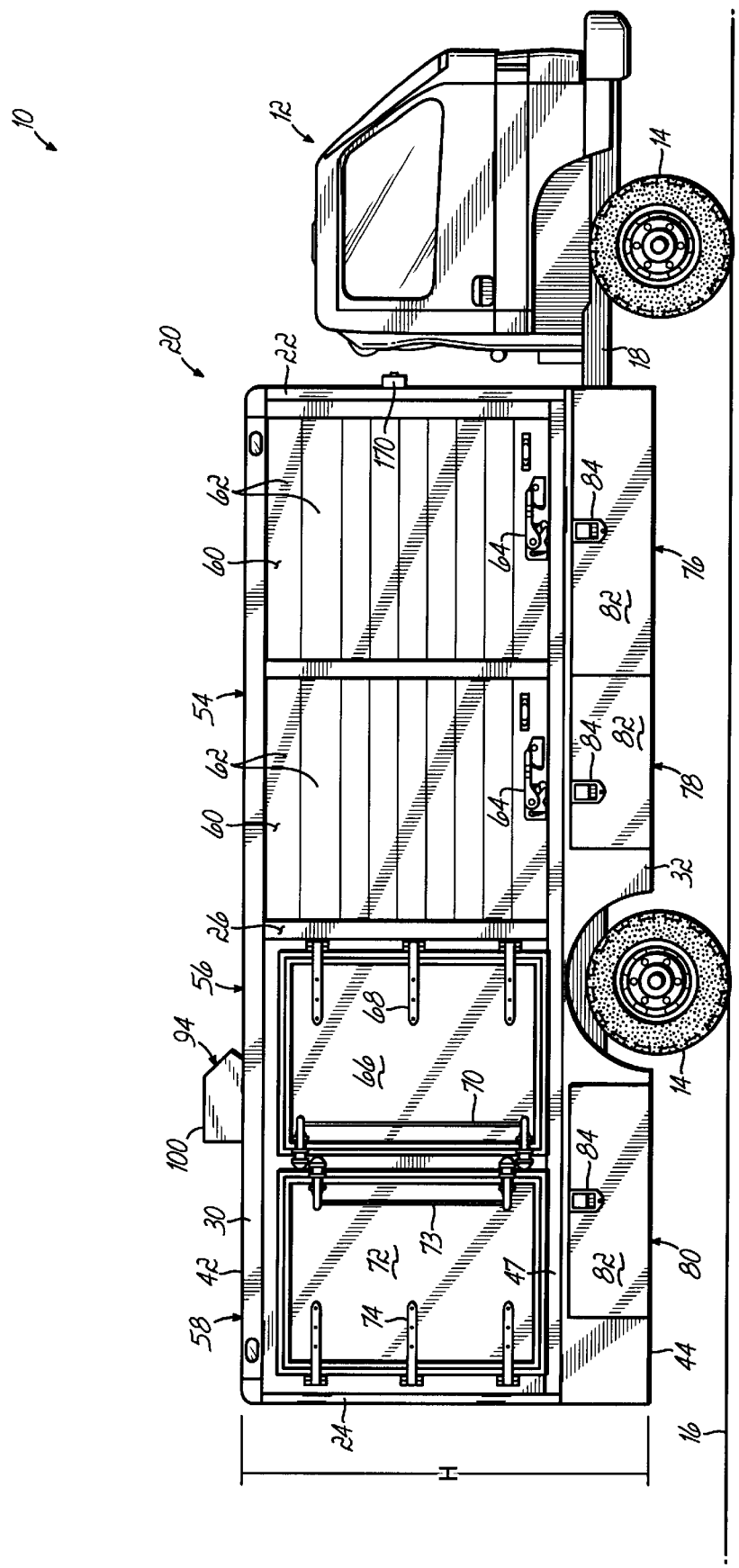
FIG. 2 is a side elevational view of the passenger side of the vehicle of FIG. 1.

Referring to the drawings and particularly FIGS. 1 and 2, a first preferred embodiment of vehicle 10 is illustrated. The vehicle 10 is adapted to transport groceries for home delivery and has multiple features specifically designed to aid in delivering multiple orders of groceries to the homes of customers. These features will be described in more detail below.

As is conventional, the vehicle 10 is driven by an engine (not shown) located in a cab 12 located at the front of the vehicle 10. The vehicle 10 is supported by wheels 14 adapted to travel along a road or surface 16. A chassis or frame 18 supported by the wheels 14 supports a generally rectangular storage unit 20.

Figure 5:
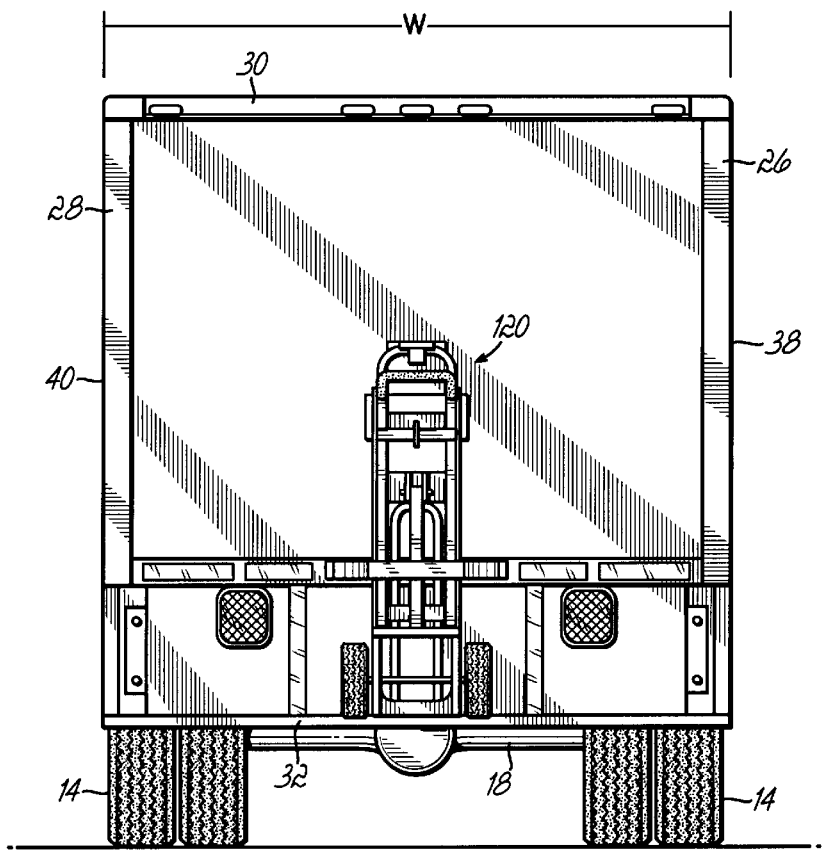
FIG. 5 is a rear elevational view of the back of the vehicle of the present invention with a two-wheeled cart attached.

The storage unit 20 has an insulated front wall 22, an insulated rear wall 24, an insulated passenger side wall 26, an insulated driver side wall 28, an insulated top 30 and a bottom 32. As illustrated in FIG. 1, a battery access panel 29 is located in the insulated driver side wall 28. The storage unit 20 has a length L extending from a generally planar front surface 34 of the front wall 22 to a generally planar rear surface 36 of the rear wall 24. Similarly, as illustrated in FIG. 5, the storage unit 20 has a width W extending from a generally planar outer surface 38 of the passenger side wall 26 to a generally planar outer surface 40 of the driver side wall 28. Lastly, the storage unit 20 has a height H extending from a generally planar upper surface 42 of the top 30 to a lower surface 44 of the bottom 32.

In this first preferred embodiment of the present invention, the storage unit 20 has an upper section 46 extending downwardly from the roof 30 to an insulated floor 47 and a lower section 48 extending downwardly from the insulated floor 47 to the bottom 32 of the storage unit 20. See FIG. 1. The insulated floor 47 preferably contains four inches of insulation but may be uninsulated or contain any thickness of insulation in accordance with the present invention. The top 30 preferably contains three inches of insulation but may be uninsulated or contain any thickness of insulation in accordance with the present invention.

The upper section 46 of the storage unit 20 is specifically configured to transport groceries in totes for home delivery. The upper section 46 of the storage unit 20 is divided into multiple compartments by a pair of insulated dividers 50, 52 which extend from the driver side wall 28 to the passenger side wall 26 and from the top 30 to the insulated floor 47 of the storage unit 20. The forwardmost divider 50 preferably contains four inches of insulation but may contain any thickness of insulation or no insulation in accordance with the present invention. Similarly, the rear divider 52 preferably contains five inches of insulation but may contain any thickness of insulation or no insulation in accordance with the present invention.

Referring to the embodiment of the invention illustrated in FIGS. 1 and 2, the storage unit 20 is divided into three compartments by the insulated dividers 50, 52: a dry goods compartment 54, a refrigerated compartment 56 and a freezer compartment 58. Insulated divider 50 is located immediately in front of the refrigerated compartment 56 and functions to separate the refrigerated compartment 56 from the dry goods compartment 54. Similarly, insulated divider 52 is located immediately behind the refrigerated compartment 56 and functions to separate the refrigerated compartment 56 from the freezer compartment 58.

The dry goods compartment 54 is maintained at ambient temperature and is located between the insulated front wall 22 and the insulated front divider 50. The insulated front wall 22, insulated front divider 50, insulated top 30, insulated floor 47, insulated driver side wall 28 and passenger side wall 26 of the storage unit 20 define an interior of the dry goods compartment 54. The interior of the dry goods compartment will be described in more detail below.

As illustrated in FIG. 2, the passenger side wall 26 of the storage unit 20 includes a pair of uninsulated, roll-up access or entry doors 60 which allow access to the interior of the dry goods compartment 54. In this embodiment, the access doors 60 are located at the front of the passenger side wall 28 of the storage unit 20. Although the dry goods compartment 54 is illustrated having two access doors 60, any number of access door(s) including only one may provide access to the interior of the dry goods compartment 54. The roll-up type of access doors 60 comprise multiple articulated panels 62 which enable the door to be pushed up into the roof 30 of the storage unit 20, as is conventional in these types of doors. A handle 64 enables each door 60 to be lifted from a lowered, closed position to a raised, open position. Each access door 60 further may be locked in the lowered, closed position via any conventional lock (not shown).

The insulated front wall 22 preferably contains three inches of insulation but may contain any thickness of insulation or no insulation in accordance with the present invention. The portions of the side walls 26, 28 of the storage unit 20 which comprise part of the dry goods compartment 54 preferably contain three inches of insulation but may contain any thickness of insulation or none in accordance with the present invention. Consequently, a minimum of three inches of insulation surround the dry goods compartment 54, other than the two entry doors 60. The insulation keeps the interior of the dry goods compartment 54 cool in summer and warm in winter in order to prevent spoilage of the groceries located therein.

As best illustrated in FIG. 1, the refrigerated compartment 56 is located between the insulated dividers 50, 52. The insulated dividers 50, 52; top 30, insulated floor 47, driver side wall 28 and passenger side wall 28 of the storage unit 20 define an interior of the refrigerated compartment 56. The refrigerated compartment 56 is maintained at a temperature slightly above freezing, preferably 38 degrees Fahrenheit, to keep items such as milk, butter and eggs cool but not frozen. The portions of the side walls 26, 28 comprising part of the refrigerated compartment 56 preferably contain four inches of insulation but may contain any thickness of insulation in accordance with the present invention.

As illustrated in FIG. 2, the refrigerated compartment 56 has an insulated entry door 66 mounted on the passenger side of the vehicle as shown in FIG. 2. To help keep the contents of the refrigerated compartment 56 cool, the entry door 66 preferably has four inches of insulation therein but may have any amount of insulation therein. The entry door 66 is hingedly connected to the passenger side wall 26 with three hinges 68, thereby enabling the entry door 66 to open about a vertical axis A, as illustrated in FIG. 6. The entry door 66 has a vertically oriented handle 70 mounted thereon to enable one to move the door 66 between a closed position illustrated in FIG. 2 and an open position illustrated in FIG. 6. Although one configuration of handle 70 is illustrated, any other type of handle may be used in accordance with the present invention.

As best illustrated in FIG. 1, the freezer compartment 58 is the rearwardmost compartment of the storage unit 20. The insulated divider 52, top 30, insulated floor 47, driver side wall 28 and passenger side wall 28 of the storage unit 20 define an interior of the freezer compartment 58. The freezer compartment 58 is maintained at a temperature below freezing, preferably −5 degrees Fahrenheit, to keep items such as ice cream and meat frozen. The portions of the side walls 26, 28 comprising part of the freezer compartment 58 preferably contain five inches of insulation but may contain any thickness of insulation in accordance with the present invention. The rear wall 24 of the truck preferably contains five inches of insulation but may contain any thickness of insulation in accordance with the present invention.

As illustrated in FIG. 2, the freezer compartment 58 has an insulated entry door 72 mounted on the passenger side of the vehicle as shown in FIG. 2. To help keep the contents of the freezer compartment frozen, the entry door 72 preferably has five inches of insulation therein but may have any amount of insulation therein. The entry door 72 is hingedly connected to the passenger side wall 26 with three hinges 74, thereby enabling the entry door 72 to open about a vertical axis, as illustrated in FIG. 6. Like the entry door 68 to the refrigerated compartment 56, the entry door 72 to the freezer compartment 58 has a vertically oriented handle 73 mounted thereon to enable one to move the door 72 between a closed position illustrated in FIG. 2 and an open position illustrated in FIG. 6. Although one configuration of handle 73 is illustrated, any other type of handle may be used in accordance with the present invention.

Although one freezer compartment 58, one refrigerated compartment 56 and one dry goods compartment 54 are illustrated, any number of freezer compartments, any number of refrigerated compartments and any number of dry goods compartments at any location inside the storage unit may be incorporated into the truck of the present invention without departing from the spirit of the present invention.

As illustrated in FIG. 2, each of the compartments 54, 56 and 58 has at least one entry door located on the passenger side of the vehicle. The entry doors are all located on the passenger or curb side of the vehicle so as to enable access to the compartments without the person loading or unloading the compartments having to watch for traffic. Consequently, grocery orders located in totes located inside the compartments may be safely and efficiently unloaded and delivered by the driver of the vehicle without having to worry about being struck by oncoming traffic.

As best illustrated in FIG. 2, the lower section 48 of the storage unit 20 comprises three belly boxes 76, 78 and 80. Each belly box is neither heated nor cooled so it is at ambient temperature. The belly boxes 76, 78 and 80 are used to store additional dry goods which need not be refrigerated, such as dog food and soda pop. Each belly box 76, 78 and 80 has an entry door 82 hingedly mounted thereon which may be locked in a closed position with a lock 84. The entry doors 82 to the belly boxes are all located on the passenger or curb side of the vehicle 10 so as to enable access to the belly boxes without the person loading or unloading these areas having to watch for traffic. Consequently, grocery orders located inside the belly boxes may be safely and efficiently unloaded and delivered by the driver of the vehicle without having to worry about oncoming traffic.

As illustrated in FIG. 6, each of the entry doors 82 of the belly boxes may be used as a step when opened. The entry door 82 of the belly box when opened is supported by two chains 86 which extend between the door 82 and the lower portion 48 of the storage unit 20. The door 82 is movable between a closed position illustrated in FIG. 1 and an open position illustrated in FIG. 6 about a hinge 87 defining a horizontal axis $A_2$. Each entry door 82 has a raised step 88 built therein which extends upwardly from an inside surface 90 of the door 82. The raised step 88 has an abrasive coating 92 on the top thereof which helps prevent one slipping off the raised step 88. The raised step 88 enables the vehicle's driver to reach totes located at the top and/or rear of the compartments 54, 56 and 58.

In order to keep the freezer compartment 58 and refrigerated compartment 56 at their desired temperatures, respectively, a refrigeration unit 94 is incorporated into the vehicle 10. The refrigeration unit 94 is partially mounted on the roof 30 of the vehicle 10 generally above the refrigerator compartment 56. The refrigeration unit 94 functions to maintain the interiors of the freezer compartment and refrigerator compartments at their desired temperatures.

One refrigeration unit which has proven satisfactory is manufactured by Thermo King Corporation and sold as model V-200 Max. This refrigeration unit utilizes a first compressor (not shown) powered by the vehicle's engine. As best illustrated in FIG. 1, when the vehicle 10 is being driven, this first compressor drives two evaporators or blowers: a first evaporator 96 located in the freezer compartment 58, and a second evaporator 98 located in the refrigerated compartment 56. The first and second evaporators 96, 98 are illustrated as being mounted to the roof 30 but may be located on the side walls of the interior of the freezer and refrigerated compartments or other locations therein. Each of the evaporators 96, 98 blows cool air to cool its respective compartment.

The refrigeration unit 94 further comprises a second compressor driven by an electric motor (not shown) both the second compressor and electric motor being located inside a roof unit 100. This electric motor is powered by an external source such as 220 volt ac 60 Hz, commonly available in commercial and residential buildings. When the truck 10 is stopped and the engine is not running, for example, when the truck is being loaded, the electric motor located in the roof unit 100 is powered by an external source. The power may be supplied via a receptacle 102 located behind an access door 104 that is electrically connected with the electric motor which drives the second compressor. To power the evaporation unit 94 when the vehicle's engine is not running, the driver or another person may plug a power cord (not shown) with a plug (not shown) into the receptacle 102 located on the vehicle 10. The power cord is electrically coupled to a power source (not shown) which may be 220 volts or any other voltage. The storage unit 20 of the vehicle 10 is electrically wired such that when the plug is electrically coupled to the receptacle 102, the second compressor located in the roof unit 100 is activated.

A second preferred embodiment is illustrated in FIGS. 3, 4, 6 and 7. For the sake of simplicity, like parts will be designated with like numerals but the numerals used to describe the second preferred embodiment will have an "a" designation after the appropriate numeral.

In this second preferred embodiment, truck 10a has a cab 12a, wheels 14a, chassis 18a, and a storage unit 20a. Storage unit 20a has an insulated front wall 22a, an insulated rear wall 24a, insulated passenger and driver side walls 26a, 28a, an insulated top 30a and a bottom 32a. Consequently, the storage unit 20 has a length La extending from a generally planar front surface 34a of the front wall 22a to a generally planar rear surface 36a of the rear wall 24a. Similarly, the storage unit 20a has a width extending from a generally planar outer surface 38a of the passenger side wall 26a (see FIG. 4) to a generally planar driver side surface 40a of the driver side wall 28a (see FIG. 3). Lastly, the storage unit 20a has a height Ha extending from a generally planar upper surface 42a of the top 30a to a lower surface 44a of the bottom 32a.

In this second preferred embodiment of the present invention, the storage unit 20a has a lower section 48a and an upper section 46a located above an insulated floor 47a. The floor 47a and top 30a are insulated in the manner described hereinabove.

Figure 3:
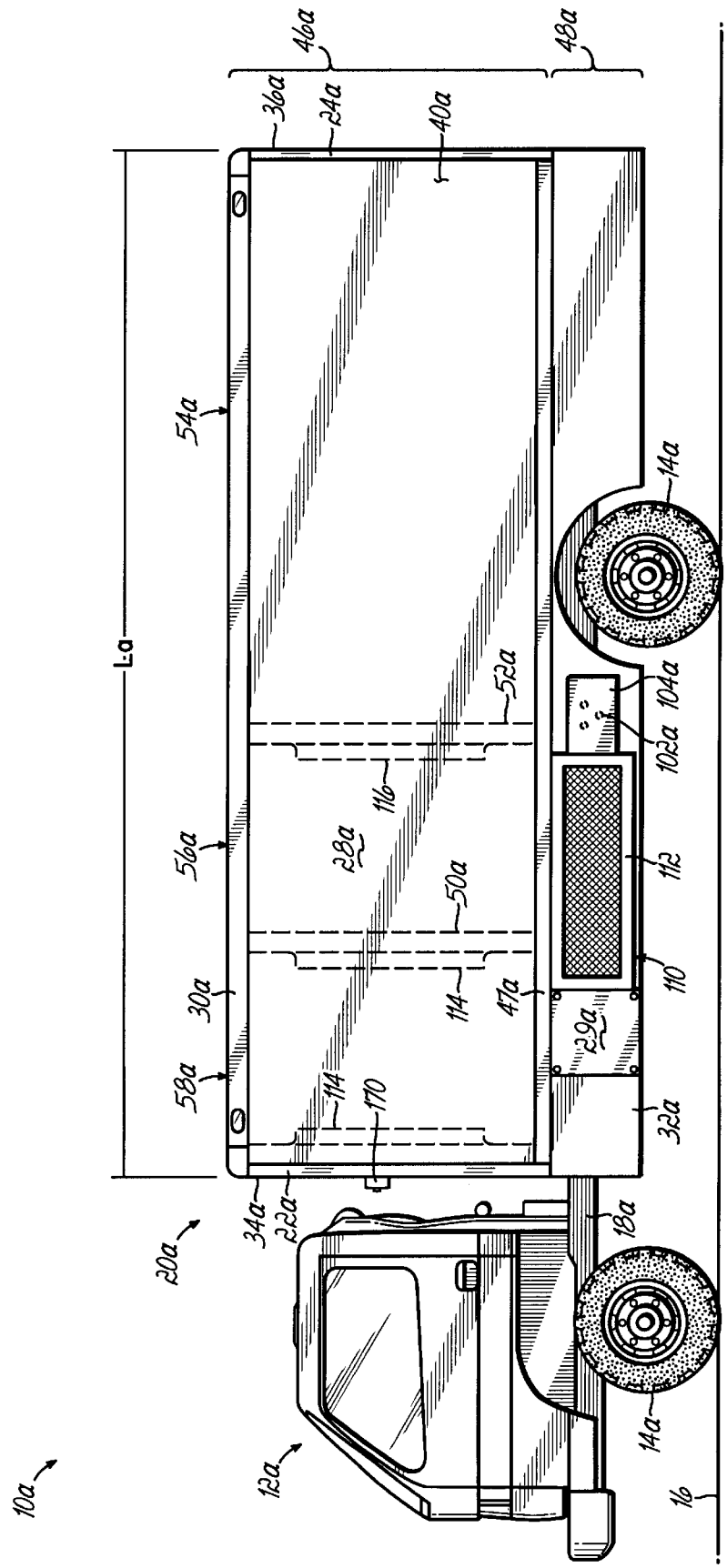
FIG. 3 is a side elevational view of the driver's side of a second preferred embodiment of the vehicle of the present invention.

As illustrated in FIG. 3, the upper section 48a is divided into three compartments by a pair of insulated dividers 50a, 52a: a a dry goods compartment 54a, a refrigerated compartment 56a and a freezer compartment 58a. Freezer compartment 58a is located immediately behind the insulated front wall 22a of the storage unit 20a. Insulated divider 50a is located immediately behind the freezer compartment 58a and functions to separate the freezer compartment 58a from the refrigerated compartment 56a. Similarly, insulated divider 52a is located immediately behind the refrigerated compartment 56a and functions to separate the refrigerated compartment 56a from the dry goods compartment 54a. The forwardmost divider 50a preferably contains five inches of insulation but may contain any thickness of insulation or no insulation in accordance with the present invention. Similarly, the rear divider 52a preferably contains four inches of insulation but may contain any thickness of insulation or no insulation in accordance with the present invention.

In this preferred embodiment, the freezer compartment 58a is the forwardmost compartment of the storage unit 20a and is maintained at a temperature below freezing so as to keep items such as ice cream and meat frozen. As illustrated in FIG. 6, the insulated front wall 22a, insulated front divider 50a, top 30a, insulated floor 47a, driver side wall 28a, and passenger side wall 26a of the storage unit 20a define an interior 104 of the freezer compartment 58a. See FIG. 6. The portions of the side walls 26a, 28a comprising part of the freezer compartment 58a preferably contain five inches of insulation but may contain any thickness of insulation in accordance with the present invention. The insulated front wall 22a also contains five inches of insulation but may contain any thickness of insulation in accordance with the present invention.

The refrigerated compartment 56a is located between the insulated dividers 50a, 52a. As illustrated in FIG. 6, the insulated dividers 50a, 52a, insulated top 30a, insulated floor 47a, driver side wall 28a and passenger side wall 26a of the storage unit 20a define an interior 106 of the refrigerated compartment 56a. See FIG. 6. The refrigerated compartment 56a is maintained at a temperature slightly above freezing so as to keep items such as milk, butter and eggs cool but not frozen. The portions of the side walls 26a, 28a comprising part of the refrigerated compartment 56a preferably contain four inches of insulation but may contain any thickness of insulation in accordance with the present invention.

The dry goods compartment 54a maintained at ambient temperature is located immediately behind the insulated rear divider 52a. The insulated rear wall 24a, insulated divider 52a, insulated top 30a, insulated floor 47a, driver side wall 28a and passenger side wall 26a of the storage unit 20a define an interior 108 of the dry goods compartment 54a. The insulated rear wall 24a and portions of the side walls 26a, 28a comprising part of the dry goods compartment 54a preferably contain three inches of insulation but may contain any thickness of insulation in accordance with the present invention.

Although one freezer compartment 58a, one refrigerated compartment 56a and one dry goods compartment 54a are illustrated, any number of freezer compartments, any number of refrigerated compartments and any number of dry goods compartments may be incorporated into this embodiment of the truck of the present invention without departing from the spirit of the present invention.

Figure 4:
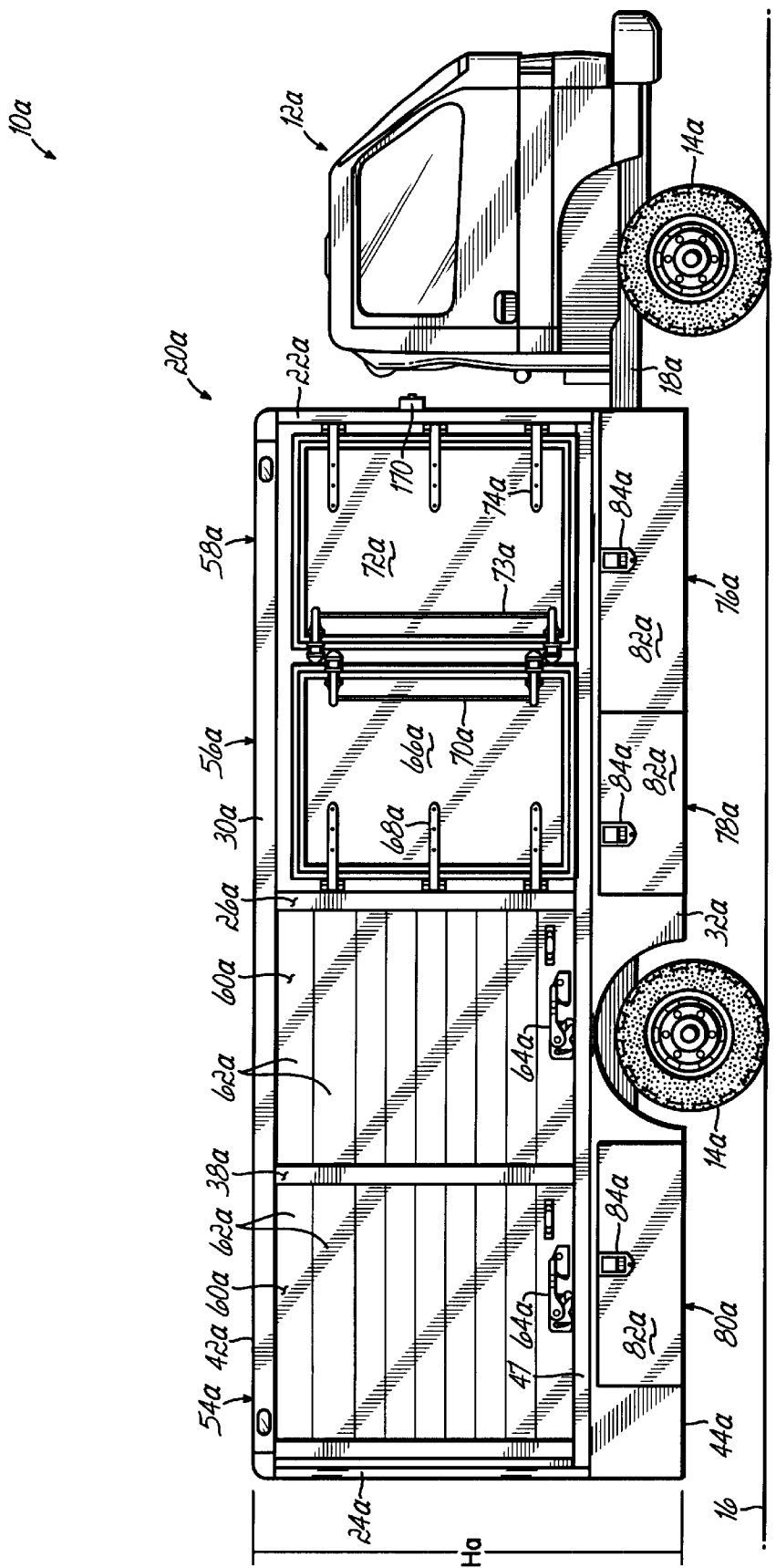
FIG. 4 a side elevational view of the passenger side of the vehicle of FIG. 3.
Figure 7:
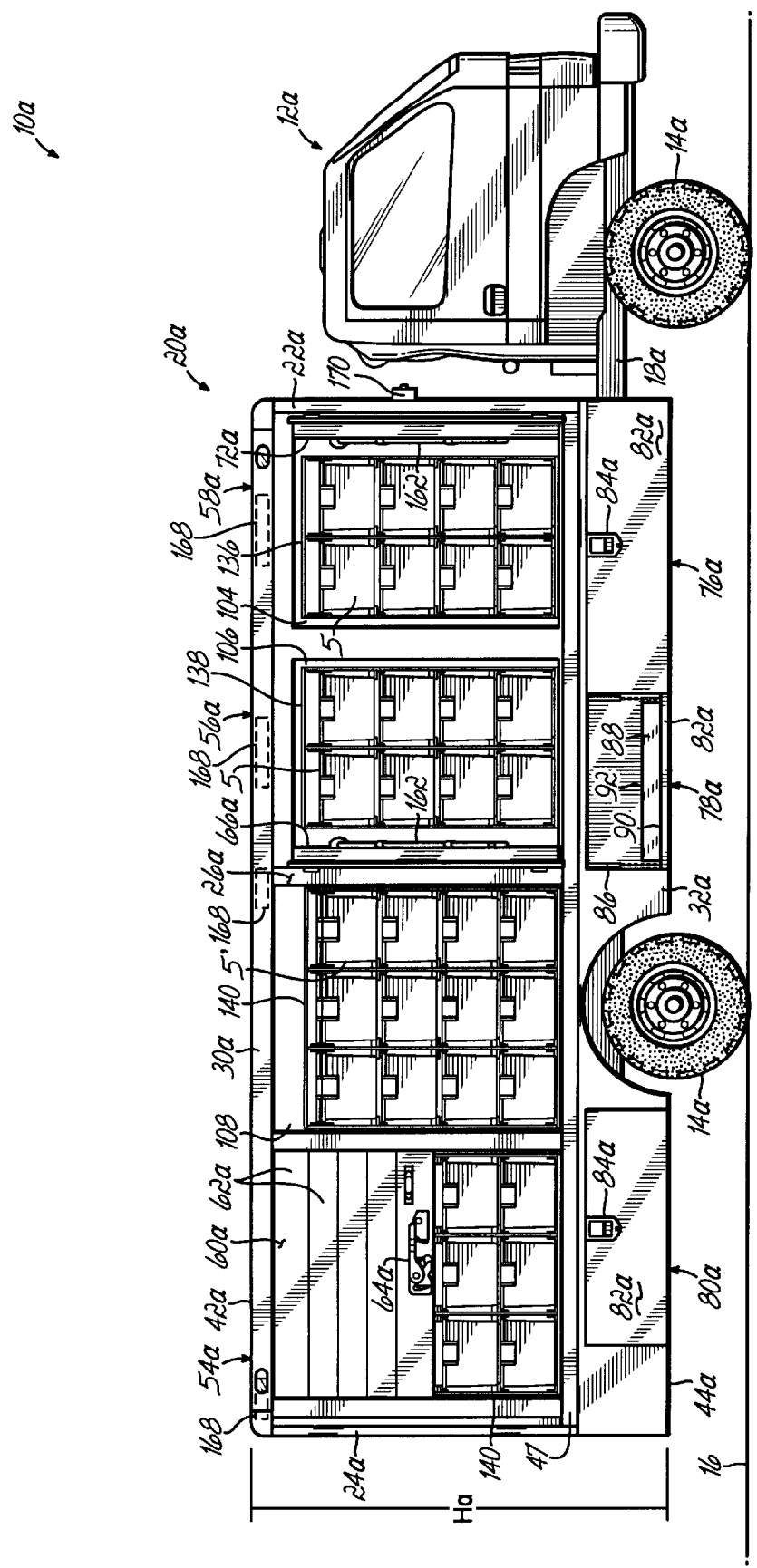
FIG. 7 is a side elevational view of the vehicle illustrated in FIGS. 3 and 4 illustrating racks and totes inside the storage unit of the vehicle.

As illustrated in FIGS. 4 and 7, the passenger side wall 26a of the storage unit 20a includes a pair of uninsulated, roll-up entry or access doors 60a allowing entry into the interior 108 of the dry goods compartment 54a. FIG. 7 illustrates the rearwardmost door 60a being partially open and the forwardmost door 60a being fully open. Although the dry goods compartment 54a is illustrated having two access doors 60a, any number of access door(s) including one may provide access to the interior 108 of the dry goods compartment 54a. The roll-up type of access doors 60a comprise multiple articulated panels 62a which enable the door to be pushed up into the roof 30a of the storage unit 20a, as is conventional in these types of doors. A handle 64a enables each door 60a to be lifted from a lowered, closed position to a raised, open position. Each access door 60a further may be locked in the lowered, closed position via any conventional lock (not shown).

As illustrated in FIGS. 4 and 7, the passenger side wall 28a of the storage unit 20a further includes an insulated door 66a for the refrigerated compartment 56a. The entry door 66a preferably has four inches of insulation therein but may have any amount of insulation therein. The entry door 66a is hingedly connected to the passenger side wall 26a with three hinges 68a, thereby enabling the entry door 66a to open about a vertical axis, as illustrated in FIG. 7. The entry door 66a has a vertically oriented handle 70a mounted thereon to enable one to move the door 66a between a closed position illustrated in FIG. 2 and an open position illustrated in FIG. 7. Although one configuration of handle 70a is illustrated, any other type of handle may be used in accordance with the present invention.

As illustrated in FIGS. 4 and 7, the passenger side wall 28a of the storage unit 20a further includes an entry or access insulated door 72a for the freezer compartment 58a. The entry door 72a preferably has five inches of insulation therein but may have any amount of insulation therein. The entry door 72a is hingedly connected to the passenger side wall 26a with three hinges 74a, thereby enabling the entry door 72a to open about a vertical axis, as illustrated in FIG. 7. The entry door 72a has a vertically oriented handle 73a mounted thereon to enable one to move the door 72a between a closed position illustrated in FIG. 2 and an open position illustrated in FIG. 7. Although one configuration of handle 73a is illustrated, any other type of handle may be used in accordance with the present invention.

As illustrated in FIG. 4, each of the compartments 54a, 56a and 58a has at least one entry door located on the passenger side of the vehicle. The entry doors are all located on the passenger or curb side of the vehicle so as to enable access to the compartments without the person loading or unloading the compartments having to watch for traffic. Consequently, grocery orders located in totes located inside the compartments may be safely and efficiently unloaded and delivered by the driver of the vehicle without having to worry about oncoming traffic.

As best illustrated in FIG. 4, the lower section 48a of the storage unit 20a comprises three belly boxes 76a, 78a and 80a. Each belly box is neither heated nor cooled so it is at ambient temperature. The belly boxes are used to store additional dry goods such as dog food and soda pop. Each belly box 76a, 78a, 80a is configured and functions as described hereinabove with regard to the first preferred embodiment.

In the second preferred embodiment of the present invention illustrated in FIGS. 3, 4, 6 and 7, the freezer compartment 58a and refrigerated compartment 56a are maintained at their desired temperatures, respectively, with a eutectic refrigeration system. One eutectic refrigeration system which has proven satisfactory is manufactured by Thermo King Corporation of Monroe, N.C. and sold as model F-3L. This eutectic condensing system utilizes a refrigeration or condenser unit 110 mounted on the truck frame 18a behind a battery access panel 29a, two cold plates 114 mounted inside the interior of the freezer compartment 58a and one cold plate 116 mounted inside the interior of the refrigerated compartment 56a. See FIG. 3. The refrigeration unit 110 includes a condenser and a compressor (not shown). When the truck is not running, i.e. in standby mode, the compressor is powered from an external A/C power source to freeze eutectic solution inside the cold plates. The refrigeration unit 110 further comprises an electric motor (not shown) powered by an external source such as 220 volt ac 60 Hz, commonly available in commercial and residential buildings. When the truck 10a is stopped and the engine is not running, for example, when the truck is being loaded, the electric motor located in the refrigeration unit 110 is powered by an external source. The power may be supplied via a receptacle (not shown) located behind an access door or screen 112 that is electrically connected with the electric motor which drives the compressor. To power the refrigeration unit 110 when the truck's engine is not running, the driver or another person may plug a power cord (not shown) with a plug into the receptacle 102a located behind access door 104a. The power cord is electrically coupled to a power source (not shown) which may be 220 volts or any other voltage. The storage unit 20a of the vehicle 10a is electrically wired such that when the plug is electrically coupled to the receptacle, the compressor inside the refrigeration unit 110 is activated.

Each cold plate 114, 116 is approximately two inches thick, 3 feet wide by 5 feet high and weighs approximately 700 lbs. Due to the weight of the cold plates, this embodiment of the vehicle 10a is designed so that the freezer and refrigerated compartments 54a, 56a are located in front of the dry goods compartment. Each cold plate 114, 116 takes over 8 hours to charge a quantity of eutectic solution such as ethylene glycol or other suitable fluid located in the cold plate. The cold plates 114, 116 are illustrated as being mounted to the side walls of the freezer and refrigerated compartment 58a, 56a, respectively, but may be mounted at other locations therein. Although two cold plates 114 are illustrated located inside the freezer compartment 58a and one cold plate 116 is illustrated located inside the refrigerated compartment 56a, any number of cold plates may be incorporated into these compartments of the present invention.

Figure 8:
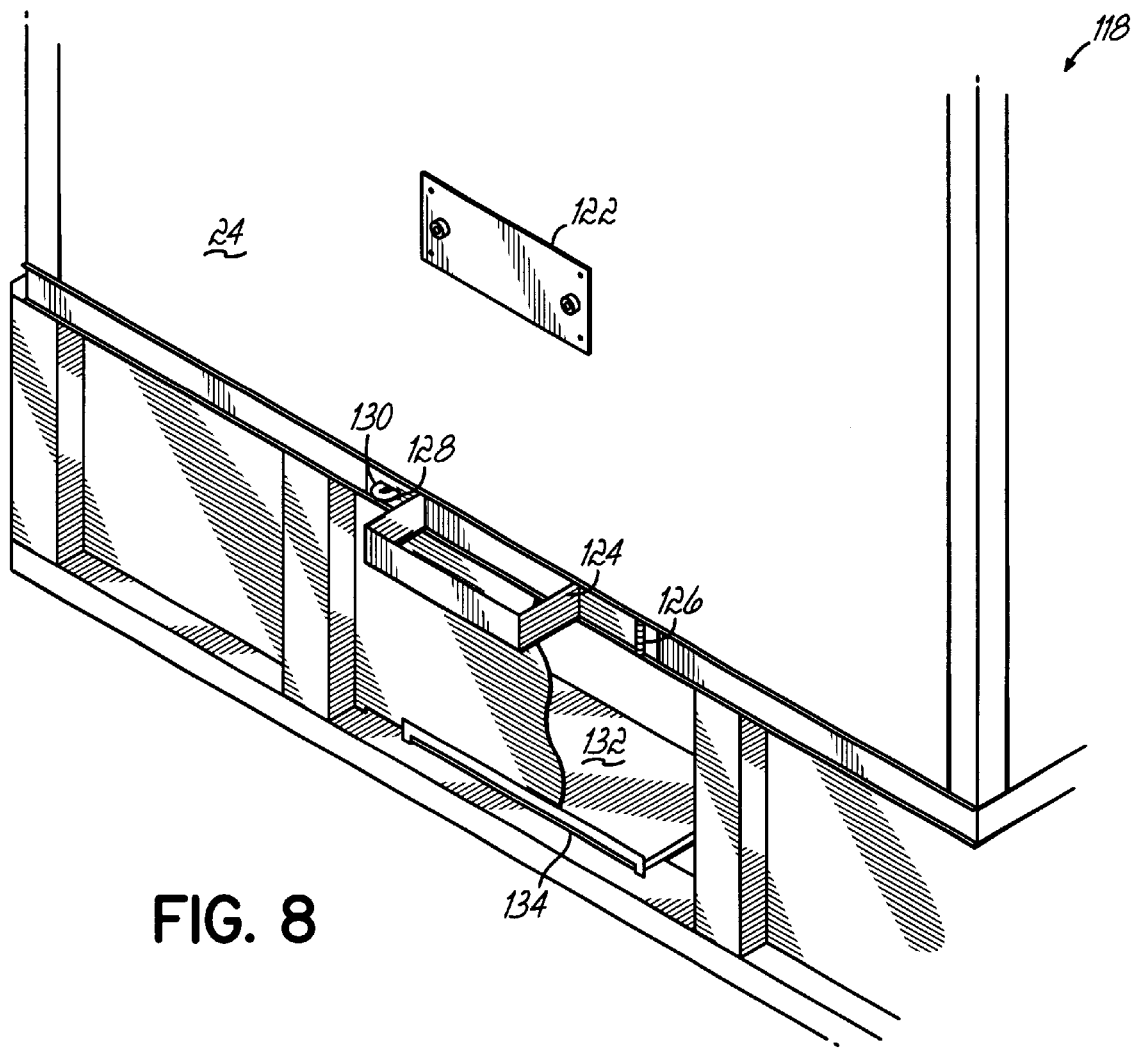
FIG. 8 is an enlarged view of a portion of the rear of the vehicle without a cart secured thereto.

FIG. 8 illustrates a rear portion 118 of the vehicle 10, regardless of which preferred embodiment is utilized. The rear portion 118 of the vehicle 10 is specifically configured to retain and carry a two wheeled cart or dolly 120 as shown in FIG. 5. Although a two wheeled cart 120 is illustrated, the vehicle may be adapted to carry any type of cart including a four wheeled cart. Referring to FIG. 8, an aluminum protective plate 122 is secured to the rear wall 24 of the vehicle's storage unit 20 for protecting the vehicle 10 from the cart 120. A stainless steel cart latch or locking bar 124 is hingedly secured to the rear wall 24 of the storage unit 20 underneath the protective plate 122. A hinge 126 enables the latch 124 to be opened and closed about a vertical axis. An opening 128 in the latch 124 enables a nose 130 projecting outwardly from the rear wall 24 of the storage unit 20 to pass therethrough. Consequently, a lock (not shown) may be used to lock the latch 124 in a closed position, thereby preventing the cart 120 from being removed from the vehicle 10. Below the storage unit 20 of the vehicle 10 an aluminum cart lip keeper 132 is located. The lip keeper 132 has an opening or slot 134 specifically adapted to receive the nose or lip (not shown) of the cart 120. Due to the structure of the rear portion 118 of the storage unit 20, the cart 120 may be safely and conveniently transported in the stored position illustrated in FIG. 5.

In each of the preferred embodiments of the present invention, a tote rack is located and secured inside the interior of each of the compartments of the storage unit. Each of the racks is specifically configured to receive totes 5 in the manner illustrated in FIG. 7. As best illustrated in FIG. 6, a rack 136 is located inside the interior 104 of the freezer compartment 58a and secured therein. Similarly, a rack 138 (shown schematically) is located inside the interior 106 of the refrigerated compartment 56a and secured therein. Also, two racks 140 are located inside the interior 108 of the dry goods compartment 54a and secured therein in any suitable manner.

Figure 6A:
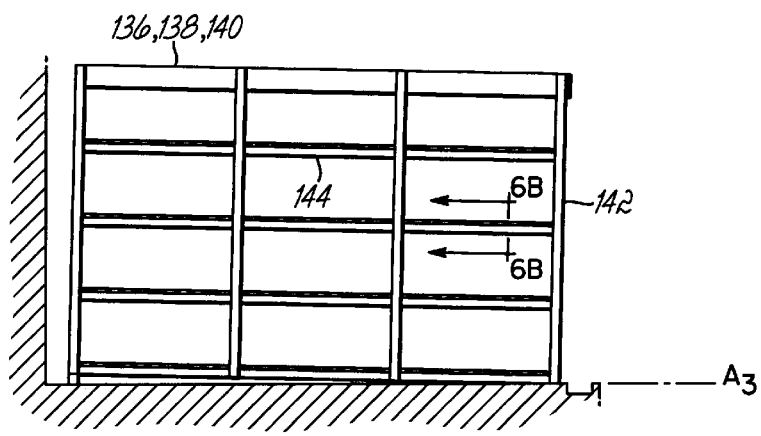
FIG. 6A is a side elevational view of a portion of one of the racks located inside one of the compartments of the vehicle.
Figure 6B:
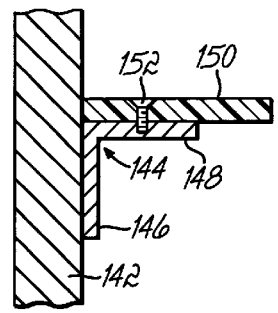
FIG. 6B is a cross-sectional view taken along the line 6B—6B of FIG. 6A.
Figure 6:
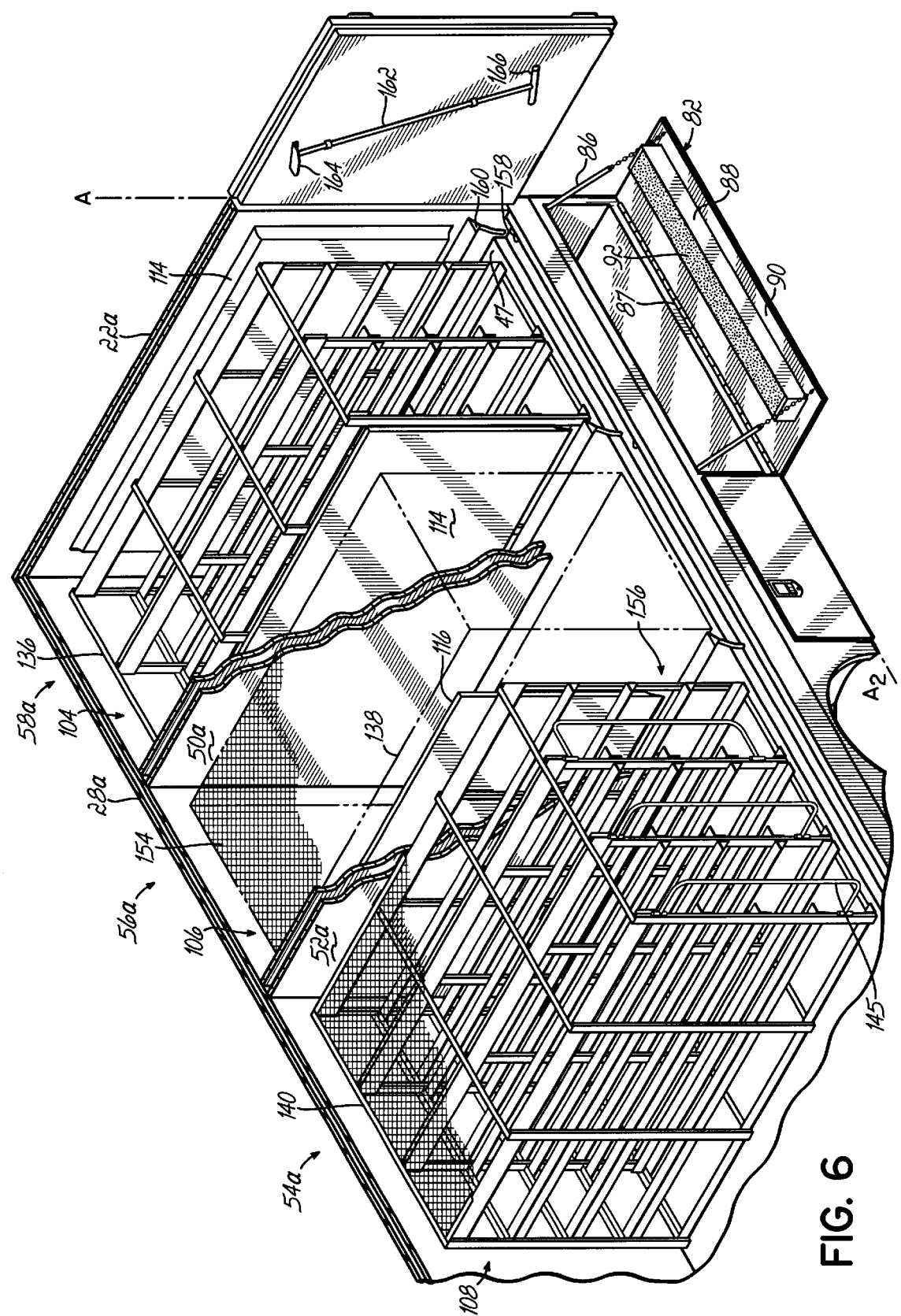
FIG. 6 is a perspective view of a portion of the storage unit of the vehicle illustrated in FIGS. 3 and 4.

As best illustrated in FIGS. 6A and 6B, each of the racks 136, 138 and 140 comprises a plurality of vertically oriented posts 142 joined by horizontally oriented members 144. Each of the horizontally oriented members 144 preferably has a vertical portion 146 secured to posts 142 and a horizontal portion 148, as illustrated in FIG. 6B. As illustrated in FIG. 6B, a plastic liner or glide 150 is secured to the horizontal portion 148 with fasteners 152. The plastic liner 150 enables the totes 5 to better slide or move along the horizontal members 144 of the racks 136, 138 and 140. As best illustrated in FIG. 6, the rack 138 located inside the interior 106 of the refrigerated compartment 56a has a steel grate 154 built at the top thereof. The grate 154 preferably has openings therethrough so that party or deli trays and other food items may be placed thereon without fluid accumulating thereon.

As best illustrated in FIGS. 6 and 7, each of the racks 136, 138 and 140 located in the freezer, refrigerated and dry goods compartments 58a, 56a, and 54a, respectively, have four layers or levels 156. In the racks 136 and 138, each level 156 is adapted to hold six totes 50, two across (see FIG. 7) and three deep (see FIG. 6). Consequently, each of the racks 136, 138 is capable of holding 24 totes in the manner illustrated in FIG. 7. As illustrated in FIG. 6, the dry goods compartment 54a has two racks 140 located therein. Each level 156 of each rack 140 is adapted to hold nine totes 5, three across (see FIG. 7) and three deep (see FIG. 6). Consequently, each of the racks 140 is capable of holding 36 totes in the manner illustrated in FIG. 7. In addition, empty totes 5' may be nestably stacked into one another and placed on the upper level of the racks 140, as illustrated in FIG. 7. Racks having different dimensions so as to hold different numbers of totes may be used in accordance with the present invention.

Another feature of the racks 136, 138 and 140 is that the racks are inclined relative to horizontal axis $A_3$ in a manner so that the totes 5 will slide toward the entry doors of the compartments or towards the passenger side of the vehicle. As best illustrated in FIG. 6A, the horizontal members 144 of the racks are declined as they extend from the driver's side wall 28 to the passenger side wall 26 of the storage unit 20.

As illustrated in FIG. 6, a pivotal tote stop 145 is located at the front of each of the racks 140 located in the dry goods compartment 54a. Each pivotal tote stop 145 is movable between a closed position and an open position. In the closed position the tote stop 145 prevents totes 5 located behind the tote stop 145 from contacting the entry doors 62a of the dry goods compartment 54a. In the open position, the tote stop 145 allows the driver to remove totes 5 from the rack 140 for home delivery. Due to the thickness of the insulated entry doors of the freezer and refrigerated compartments, the tote racks therein do not have tote stops to prevent totes from sliding therein.

As illustrated in FIG. 6, the interiors 106, 108 of the refrigerated and freezer compartments 56a, 58a, respectively, have at least one drain hole 158 built in the floor 47 thereof which is adapted to remove condensed fluid from the interiors of the compartments. Each of these two compartments has a trough or tray 160 extending along the width of the compartment adapted to catch fluid condensing off the cold plates 114, 116 and guide the fluid into the drain holes 158.

Another feature of both embodiments of the vehicle of the present invention is that tote poles 162 (only one being shown) are secured to the inside surfaces of the entry doors of the refrigerated and freezer compartments 56a, 58a. See FIG. 6. Each tote pole 162 has a plate 164 on one end of the pole 162 and a T-shaped handle 166 on the other end of the pole 162. The tote pole 162 enables the vehicle's driver to pull totes full of groceries from the driver's side of the racks towards the passenger side of the racks (towards the entry doors). In addition, tote poles of other configurations or sizes may be used in accordance with the present invention.

Another feature of both embodiments of the vehicle of the present invention is that each of the compartments of the storage unit has lights 168 therein, as illustrated in FIG. 7. The lights 168 are electrically connected to a timer or switch 170 secured to the front wall 24 of the storage unit 20. The lights 168 enable the vehicle's driver to remove totes full of groceries quickly and easily in the dark.

Regardless of which embodiment is utilized, the vehicle of the present invention may hold up to 120 totes, mounted on tote racks in the freezer, refrigerated and dry goods compartments. In the dry goods compartment, up to 72 totes may be stored. In each of the freezer and refrigeration compartments up to 24 totes may be stored. With such adequate storage, up to 12 or 13 deliveries per truck may be stored in the storage unit of the vehicle before the vehicle must return to the grocery store to refill.

While I have described one preferred embodiment of the present invention, persons skilled in the art may appreciate minor modifications which may be made to the present invention without departing from the spirit of the invention. Therefore, I do not intend to be limited except by the scope of the following claims.

I claim:

1. A motorized vehicle powered by an engine and adapted to transport groceries for home delivery, said vehicle comprising:

a chassis supported by wheels, a storage unit supported by said chassis and having a front side, a rear side, a passenger side and a driver side, said storage unit being divided into multiple compartments by dividers, each of said compartments having a tote rack secured therein adapted to store multiple totes, one of said compartments being a freezer compartment, one of said compartments being a refrigerated compartment and one of said compartments being a dry goods compartment maintained at ambient temperature, each of said compartments having an entry door mounted on at least one of said passenger and driver sides of the storage unit; and a refrigeration unit comprising a first compressor powered by the engine of the vehicle and a second compressor powered by an electric motor located inside a roof unit for maintaining the freezer compartment at a temperature below freezing temperature and maintaining the refrigerated compartment at a temperature slightly above freezing temperature.

2. The vehicle of claim 1 wherein said dry goods compartment has a roll-up entry door.

3. The vehicle of claim 2 wherein said dry goods compartment is located in front of the freezer and refrigerator compartments.

4. The vehicle of claim 2 wherein each of said entry doors is located on the passenger side of the vehicle.

5. The vehicle of claim 1 wherein said storage unit further comprises at least one belly box located below said compartments adapted to store additional groceries.

6. A motorized vehicle powered by an engine and adapted to transport groceries for home delivery, said vehicle comprising:

a chassis supported by wheels, an insulated storage unit supported by said chassis and having a driver side and a passenger side, said insulated storage unit being divided into multiple compartments by insulated dividers, at least one of said compartments being a freezer compartment and at least one of said compartments being a refrigerated compartment, each of said refrigerated and freezer compartments having an insulated entry door mounted on said passenger side of the storage unit; and a refrigeration unit comprising a first compressor powered by the engine of the vehicle and a second compressor powered by an electric motor located inside a roof unit mounted on a roof of the vehicle for maintaining the freezer compartment at a temperature below freezing temperature and maintaining the refrigerated compartment at a temperature slightly above freezing temperature and at least one tote rack secured in each of said compartments adapted to store multiple layers of totes wherein when the engine is not operating power may be supplied to a receptacle on said storage unit to power the second compressor to maintain the temperature of the compartments.

7. A motorized vehicle powered by an engine adapted to transport groceries for home delivery, said vehicle comprising:

a chassis supported by wheels, a storage unit supported by said chassis, said storage unit having a front side, a rear side, a passenger side and a driver side, said storage unit being divided into multiple compartments including a freezer compartment, a refrigerated compartment and a dry goods compartment located in front of the freezer and refrigerated compartments, each of said compartments having an entry door mounted on at least one of said passenger and driver sides of the storage unit, a refrigeration unit comprising a first and second compressor, said second compressor being powered by an electric motor located inside a roof unit mounted on a roof of the vehicle wherein said refrigeration unit maintains said freezer compartment at a temperature below freezing temperature and said refrigerated compartment at a temperature slightly above freezing temperature, said dry goods compartment being maintained at ambient temperature wherein power may be supplied to a receptacle on said storage unit electrically coupled to said second compressor to power the second compressor to maintain the temperature of the compartments when the engine of the vehicle is not operating, at least one tote rack secured in each of said compartments adapted to store multiple layers of totes.

8. The vehicle of claim 7 wherein said storage unit further comprises at least one belly box located below said compartments, said at least one belly box being adapted to store additional groceries.

9. The vehicle of claim 7 wherein each of said racks has plastic liners to enable totes to slide along horizontal members of said racks.

10. A vehicle adapted to transport groceries for home delivery, said vehicle comprising:

a chassis supported by wheels, a storage unit supported by said chassis, said storage unit having a front side, a rear side, a passenger side and a driver side, said storage unit being divided into multiple compartments, a freezer compartment maintained at a temperature below freezing temperature, a refrigerated compartment maintained at a temperature slightly above freezing temperature and at least one dry goods compartment maintained at ambient temperature, each of said compartments having an entry door mounted on said passenger side of the vehicle storage unit, said storage unit further comprising at least one belly box having an interior adapted to store additional groceries, said interior of said belly box being at ambient temperature, and at least one tote rack secured in each of said compartments adapted to store multiple layers of totes, said tote rack being inclined so that the totes will slide toward the passenger side of the storage unit.

11. The vehicle of claim 10 wherein said vehicle has three belly boxes.

12. The vehicle of claim 10 wherein said entry door for each of said dry goods compartments is adapted to roll up into a top portion of the vehicle.

13. The vehicle of claim 10 wherein said vehicle is adapted to carry a cart on a rear portion of the vehicle.

14. The vehicle of claim 10 wherein each of said freezer and refrigerated compartments has a drain hole adapted to remove condensed fluid from said compartment.

15. The vehicle of claim 10 wherein each of said belly boxes has a door which when opened functions as a step.

16. A vehicle adapted to transport groceries for home delivery, said vehicle comprising:

a chassis supported by wheels, a storage unit supported by said chassis and having a front side, a rear side, a passenger side and a driver side defining an interior of said storage unit, said interior of said storage unit being divided by insulated dividers into a freezer compartment, a refrigerated compartment in front of said freezer compartment and a dry goods compartment in front of said refrigerated compartment, each of said compartments having at least one entry door mounted on said passenger side of the storage unit;

a refrigeration unit comprising a first compressor powered by the engine of the vehicle and a second compressor powered by an electric motor located inside a roof unit mounted on a roof of the vehicle for maintaining the freezer compartment at a temperature below freezing temperature and maintaining the refrigerated compartment at a temperature slightly above freezing temperature, at least one tote rack secured in each of said compartments adapted to store multiple layers of totes; and at least one belly box, each of said belly boxes having an interior at ambient temperature and an entry door on said passenger side of said storage unit.

17. The vehicle of claim 1 wherein said refrigeration unit further comprises a receptacle located on said storage unit electrically coupled to said electric motor for powering said second compressor.

18. The vehicle of claim 1 wherein each of said tote racks has multiple levels, each level being adapted to store multiple totes.

19. The vehicle of claim 1 wherein each of said tote racks comprises horizontal members which are declined as the horizontal members extend towards the entry door of the compartment in which said tote rack is located.

20. The vehicle of claim 1 wherein the tote rack located in the dry goods storage compartment has a pivotal tote stop to prevent totes from contacting the entry door of the dry goods compartment.

21. The vehicle of claim 1 further comprising a tote pole secured to an inside surface of one of the entry doors of one of the refrigerated and freezer compartments to facilitate removal of totes from said compartments.

22. The vehicle of claim 1 wherein each of said compartments is lighted.

* * * * *